3,658,770
UNSATURATED PARTIALLY CRYSTALLINE TERPOLYMERS OF ETHYLENE, PROPYLENE AND HYDROCARBON DIENES OR POLYENES, AND PROCESS FOR PREPARING SAID TERPOLYMERS
Paolo Longi, Alberto Valvassori, and Francesco Greco, Milan, and Ermanno Bernasconi, Caronno Varesino, Italy, assignors to Montecatini Edison S.p.A., Milan, Italy
No Drawing. Filed Dec. 13, 1968, Ser. No. 783,697
Claims priority, application Italy, Dec. 15, 1967, 23,915/67
Int. Cl. C08f 17/00, 15/40, 27/06
U.S. Cl. 260—79.5 P                                           11 Claims

ABSTRACT OF THE DISCLOSURE

There are disclosed unsaturated terpolymers of ethylene, propylene, and hydrocarbon monomers containing at least two double bonds, which terpolymers exhibit from 20% to 75% crystallinity but are vulcanizable to elastomeric materials. The terpolymers are obtained by polymerizing a mixture of ethylene, propylene and at least one of the hydrocarbon monomers containing at least two double bonds in contact with a catalyst prepared from titanium or vanadium compounds and an organometallic aluminum compound.

---

Terpolymers of ethylene, higher alpha-olefins, and various unsaturated termonomers containing at least two double bonds are known. A number of such terpolymers have been disclosed in patent applications and patents originating with our group.

Such known terpolymers have, in general, an ethylene content of 5% to 80% by moles, are amorphous on X-ray examination in the relaxed state, and are vulcanizable by means of conventional mixes based on sulphur and accelerators to products which, due to the good elastic characteristics thereof, can be used for various purposes in the elastomers field.

In accordance with this invention, it is found that by using the catalysts and conditions described infra, there are obtained terpolymers of ethylene, propylene and unsaturated termonomers containing at least two double bonds which differ from the known terpolymers of the prior disclosures discussed supra in being partially crystalline on X-ray examination in the relaxed state, which are also sulphur-vulcanizable and which have many uses, particularly after vulcanization, in the fields of elastic fibers, film, vulcanizable thermoplastic products and thermoelastic elastomers.

These terpolymers contain, by mols, 85–97% of ethylene; 3–15% of propylene; and 0.1–10% termonomer, and exhibit, on X-ray examination, a total crystallinity of between 20% and 75%, determined on the non-annealed crude terpolymer. The crystallinity is of polyethylene type.

After vulcanization the products have elongations at break comprised between 20% and 1000%; tensile strengths comprised between 20 kg./cm.$^2$ and 400 kg./cm.$^2$, and elastic recoveries comprised between 50% and 99%.

The termonomers copolymerized with ethylene and propylene to obtain these new partially crystalline, sulphur-vulcanizable terpolymers may be linear or cyclic hydrocarbons containing at least two double bonds of which only one enters into the copolymerization reaction in contact with the catalysts described below, the remaining double bond or bonds being available in the terpolymer macromolecule and capable of forming crosslinking bonds according to one or more of the vulcanizing procedures discussed below.

Typical examples of the termonomers which can be used to produce these terpolymers include the following classes:
(a) aliphatic, non-conjugated dienes or polyenes having from 5 to 14 carbon atoms, such as
   hexadiene-1,4
   5,7-dimethyloctadiene-1,6
   decatriene-1,4,9
(b) alkenylcycloalkenes, having from 6 to 15 carbon atoms, such as
   4-vinylcyclohexene-1
   3(2-butenyl)-cyclobutene
(c) non-conjugated monocyclic dienes, having from 6 to 14 carbon atoms, such as
   cyclooctadiene-1,5
   cycloheptadiene-1,4
(d) polycyclic endomethylenic polyenes, having from 7 to 16 carbon atoms, such as
   dicyclopentadiene
   5-butenyl-norbornene-2
   5-isopropenyl-norbornene-2
   5-ethylidenenorbornene-2
(e) polycyclic polyenes having condensed rings in which each pair of condensed rings has two carbon atoms in common, having from 7 to 20 carbon atoms, such as
   4,9,7,8 - tetrahydroindene; 6-methyl-4,9,7,8-tetrahydroindene; 5,6-dimethyl-4,9,7,8-tetrahydroindene;
(f) di- or polyalkenylcycloalkanes, having from 8 to 20 carbon atoms, such as
   divinylcyclobutane
   trivinylcyclohexane Mixtures of ethylene, propylene and termonomers of the classes mentioned are polymerized, in accordance with this invention, in contact with catalystic systems prepared from (a) a titanium or vanadium compound, such as titanium trichloride, titanium tetrachloride, titanium alkoxy chloride, vanadium trichloride, vanadium tetrachloride, vanadium triacetylacetonate, vanadium alkoxy chloride, etc.; and
(b) an organometallic compound of aluminum, such as triethyl aluminum, triisobutyl aluminum, trihexyl aluminum, diethyl aluminum chloride, diethyl aluminum bromide, ethylaluminum sesquichloride, ethylaluminum dichloride, diethylaluminum monoalcoholate, alkoxyethylaluminum chloride, etc.

In practice, the catalytic system contains halogen, the catalyst-forming components being selected so that at least one contains halogen.

The polymerization is conducted in the substantial absence of air and moisture, generally by using, as diluents, such inert hydrocarbon solvents as n-heptane, cyclohexane, benzene or toluene, or by using liquid propylene as the diluent. The polymerization is carried out at temperatures comprised between —80° C. and +150° C., preferably between —40° C. and +80° C.

Ethylene and propylene may be introduced into the polymerization reactor in the form of mixed gases, or those monomers may be introduced separately; ethylene in the gaseous state and propylene in the liquid state. It is convenient to introduce the termonomer in solution in a hydrocarbon solvent.

The terpolymers obtained have a molecular weight higher than 20,000, as proved by their having an intrinsic viscosity higher than 0.5, determined in tetrahydronaphthalene at 135° C.

The relative proportions of the three monomers are selected to result in terpolymers having the ethylene/propylene/termonomer contents aforesaid.

For instance, when a vanadium oxychloride/diethylaluminum chloride catalytic system, or a vanadium triacetylacetonate/diethylaluminum chloride catalytic system are employed, terpolymers having ethylene and propylene contents within the specified limits are obtained by feeding, at a temperature of 0° C., the two gaseous monomers in propylene/ethylene molar ratios comprised between 0.05 and 0.5.

In order to obtain terpolymers having a controlled average degree of polymerization, it may be necessary to include, in the mixture to be polymerized, suitable agents which function to regulate the molecular weight, such as hydrogen, diethyl zinc, diethyl cadmium, and other organometallic compounds of zinc and cadmium, halogenated hydrocarbons, diolefins with cumulated double bonds, such as allene, or acetylenic hydrocarbons.

On completion of the polymerization reaction, and in order to purify and isolate the terpolymer, the reaction product is generally poured into a mixture of acetone and methanol in a proportion of 1:1 by volume and containing 5% of concentrated HCl. The separated terpolymer is then broken up, washed repeatedly with methanol and HCl, then with pure methanol, and finally dried at about 100° C. at reduced pressure.

The terpolymers obtained as described, and independently of the molar contents of ethylene and propylene, are free of crosslinks and completely soluble in boiling toluene, xylene and tetralin. However, these terpolymers can be transformed into crosslinked polymers insoluble in any solvent by the following processes:

(1) Vulcanization with sulphur according to known techniques and in the presence or absence of fillers;

(2) Crosslinking with sulphur chlorides used either in the gaseous phase or in solution in aliphatic, aromatic or halogenated hydrocarbons, ethers, etc., at temperatures comprised between 0° C. and 150° C., at partial pressures of the reactants comprised between 0.1 and 10 atm. (or at concentrations comprised between 0.1% and 100%, preferably between 1% and 50%), and for a time comprised between 1 minute and 600 minutes;

(3) Crosslinking by adding to the terpolymer unsaturated monomers containing one or more double bonds (for instance, divinylbenzene, styrene, diolefins, etc.) resulting in the copolymerization of the additive with unsaturated units deriving from the termonomer and present in the terpolymer macromolecule by means of initiators of the radical type (also added to the mixture to be polymerized) such as azobis-isobutyronitrile, dibenzoylperoxide, dicumylperoxide, etc., with or without the inclusion of fillers for the terpolymer, or of preformed unsaturated polymers such as for instance, styrene/vinylcyclohexene copolymer; styrene/butadiene copolymer, etc., which crosslinking process is preferably carried out at a temperature comprised between 50° C. and 150° C.;

(4) Vulcanization according to (1) above, but with the addition of radical initiators such as those mentioned under (3) above, or of sulphur chlorides as referred to under (2) above, and at temperatures preferably comprised between 20° C. and 150° C.; and (5) Crosslinking by means of more than one of the techniques described under (1) and (4) above.

The crosslinking treatment modifies some of the physical and mechanical characteristics of the terpolymer, such as, for instance, the tensile strength, elongation at break, elastic recovery, and solubility.

The terpolymers which exhibit the polyethylene type crystallinity in the lower part of the range 20% to 75% resemble elastomers; those which exhibit said crystallinity in the upper part of the range 20% to 75% resemble plastomers. These peculiar properties of the new partially crystalline but sulphur-vulcanizable terpolymers and the possibility of converting the same to crosslinked polymers make these terpolymers particularly useful for the production of elastic fibers, films, and so on.

The terpolymers can be formed into fibers, films and other shaped articles prior to, or during the crosslinking treatment.

The following examples are illustrative of the invention and are not intended as limiting.

EXAMPLE 1

The apparatus used consisted of a 5-necked cylinder flask of 2000 cc. capacity, provided with a mechanical stirrer, a thermometer, a dropping funnel, and two tubes for introducing and discharging the gases.

Into the apparatus, thermostatted at 0° C., there were introduced, in a nitrogen atmosphere, 1500 cc. of n-heptane, 1.8 g. of $Al(C_2H_5)_2Cl$, 10 cc. of 6 - methyl-4,9,7,8-tetrahydroindene. A current of ethylene gas was fed in at a flow rate of 645 liters/hour; a current of propylene gas was fed in at a flow rate of 255 liters/hour.

After about 30 minutes, a solution of 0.6 g. of $VOCl_3$ in 10 cc. of n-heptane was introduced.

Ten minutes after the addition of the $VOCl_3$, the reaction product was poured into about 3 liters of a 1:1 acetone/methanol mixture containing 5% of concentrated HCl. The terpolymer which separated was comminuted, washed repeatedly with methanol and HCl, finally washed with pure methanol, and dried at 100° C. under a reduced pressure.

There were thus obtained 22 g. of a terpolymer having an intrinsic viscosity $[\eta]=6.6$ dl./g., in tetrahydronaphthalene at 135° C., and containing, in percent by moles, 89.2% ethylene, 10.2% propylene, and 0.6% methyltetrahydroindene.

On X-ray examination, the terpolymer exhibited 37.3% of polyethylenic type crystallinity. It had an ultimate melting temperature of 52° C.

It was subjected to successive solvent extractions with boiling solvents with the following results:

diethyl ether—2.5% extracted and found to be a completely amorphous product;

n-heptane—97.5% extracted and found to exhibit polyethylenic type crystallinity.

About 10 g. of the terpolymer were vulcanized at 150° C. for 80 minutes, using the following recipe:

|  | Parts by weight |
|---|---|
| Terpolymer | 100 |
| Ultrasil VN3 ($SiO_2$ of high purity) | 10.0 |
| Vulcafor (mercaptobenzothiazol) | 0.5 |
| Eveite MS (tetramethylthiuram monosulphide) | 1.0 |
| Sulphur | 1.0 |
| Zinc Oxide | 5.0 |

Some mechanical and dynamic properties of the vulcanized terpolymers, as determined according to ASTM Test D412–64T (Die D), are recorded in Table 1.

EXAMPLE 2

Example 1 was repeated, except that the apparatus was thermostatted at 20° C., 4-vinylcyclohexene-1 (40 cc.) was used as the termonomer (instead of methyltetrahydroindene), 0.09 g. of vanadium triacetylacetonate dissolved in 10 cc. of toluene was used as one catalyst-forming component (instead of $VOCl_3$); and the flow rates of ethylene and propylene were, respectively, 335 and 265 liters/hour.

After 30 minutes from the addition of the vanadium triacetylacetonate, the run was interrupted and the polymer was isolated by the procedure described in Example 1. It weighed 21 g.; had an intrinsic viscosity $[\eta]=3.9$ dl./g.; and the following composition in percent by moles:

Ethylene: 85.5%
Propylene: 14.2%
Vinylcyclohexene: 0.3%

On X-ray examination, this terpolymer exhibited a polyethylenic type crystallinity of 20%, that is 20% of the total terpolymer was crystalline and the crystallinity was of polyethylenic type. Its ultimate melting temperature (temperature of complete melting) was 42° C.

The terpolymer was extracted successively with boiling diethyl ether and n-heptane, with the following results:

diethyl ether—24% extracted and found to be completely amorphous
n-heptane—76% extracted and found to exhibit the polyethylenic crystallinity.

A sample of the crude (unfractionated) terpolymer was sulphur-vulcanized using the recipe and conditions given in Example 1. Some mechanical and dynamic properties of the vulcanized product are shown in Table 1. As in Example 1, the properties were determined in accordance with ASTM Test D 412–64T (Die D).

EXAMPLE 3

Example 1 was repeated, except that 30 cc. of 5,7-dimethyloctadiene-1,6-was used as termonomer, 0.54 g. of vanadium triacetyl-acetonate dissolved in 30 cc. of toluene was used as one catalyst-forming component (instead of $VOCl_3$), and the ethylene and propylene flow rates were, respectively, 265 and 335 liters/hour.

Vanadium triacetylacetonate was added to the polymerization reactor in 3 increments of 0.18 g. each at 5-minute intervals.

10 minutes after the last addition of vanadium triacetylacetonate, the polymerization was stopped. Proceeding as in Example 1, 20 g. of terpolymer were isolated. It had intrinsic viscosity $[\eta]=1.3$ dl./g. and contained, in percent by moles, 89.5% ethylene; 9.6% propylene; and 0.9% dimethyloctadiene.

On X-ray examination, this terpolymer exhibited 32% polyethylenic type crystallinity. Its ultimate melting temperature was 44.5° C. On extracting it successively with boiling ether and n-heptane, the following fractions were obtained:

with ether, 3.5% of a completely amorphous product;
with n-heptane, 96.5% of a product having the polyethylenic crystallinity.

A sample of the crude (total; unfractionated) terpolymer was sulphur-vulcanized using the recipe and conditions described in Example 1. Some mechanical and dynamic properties of this terpolymer, determined as in Example 1, are reported in Table 1.

EXAMPLE 4

In an apparatus of the type as described in Example 1, having however 3000 cc. capacity, then were introduced 2000 cc. of n-heptane, 1.73 g. of $Al(C_2H_5)_2Cl$, 0.19 g. of $Zn(C_2H_5)_2$ and 3 cc. of 5-ethylidenenorbornene-2. The whole was cooled down to −20° C. and a current of ethylene gas was fed in at a flow rate of 475 liters/hour; a current of propylene gas was fed in at a flow rate of 425 liters/hour.

After about 20 minutes, a solution of 0.03 g. of vanadium triacetylacetonate in 10 cc. of toluene was added. During the polymerization, 5 cc. of 5 ethylidenenorbornene-2 were gradually added (1 cc. each 5 minutes).

30 minutes after the addition of vanadium triacetylacetonate, the polymerization reaction was stopped and the polymer was isolated by the procedure described in Example 1. It weighed 21 g.; had an intrinsic viscosity $[\eta]=1.23$ dl./g. in tetrahydronaphthalene at 135° C. and contained, in percent by moles, 89.5% ethylene, 8.6% propylene and 1.9% ethylidenenorbornene.

On X-ray examination, the terpolymer exhibited 25% of polyethylenic type crystallinity. The ultimate melting temperature was 41° C.

It was subjected to successive extractions with boiling solvents, with the following results:

diethyl ether—6.5% extracted and found to be a completely amorphous product;
n-heptane—93.5% extracted and found to exhibit polyethylenic type crystallinity.

A sample of the raw terpolymer was press-molded into a thin plate and vulcanized with sulphur, at 130° C. for 30 minutes, using the following recipe:

| | Parts by weight |
|---|---|
| Terpolymer | 100 |
| Ultrasil VN2 ($SiO_2$) | 10 |
| S.W.C.[4,4′-thio-bis-(6-t-butylmethacresol)] | 0.2 |
| $TiO_2$ | 4 |
| MBT (mercapto-benzothiazol) | 0.5 |
| ZDC (Zinc diethyldithiocarbamate) | 1.5 |
| Sulphur | 1.5 |

Some mechanical and dynamic properties of the vulcanized terpolymer, as determined according to ASTM Test D 412–64T (Die D) are recorded in Table 1.

Another sample of the polymer was transformed into a thin film (0.3 mm. of thickness) by calendering and then vulcanized with sulphur, by using the conditions and the recipe above described for the plate. The mechanical and dynamic properties of the vulcanized film were the same as the properties of the plate (see Table 1). Tensile strength and elongation were determined according to ASTM Test D882–64T; elastic recovery was determined according to ASTM Test D412–64T (Die D).

TABLE 1

| Elongation at break (percent) | Tensile strength, kg./cm.² | Percent elastic recovery at 100% elongation |
|---|---|---|
| 500 (Example 1) | 230 | 60 |
| 660 (Example 2) | 280 | 78 |
| 620 (Example 3) | 250 | 75 |
| 675 (Example 4) | 350 | 88 |

Provided the catalysts disclosed herein are used and the relative proportions of the comonomers are selected to result in terpolymers containing, by moles, 85–97% ethylene; 3–15% propylene; and 0.1–10% termonomer, similar terpolymers which are partially crystalline and exhibit from 20% to 75% of polyethylenic and/or polypropylenic (isotactic) crystallinity, but which are sulphur-vulcanizable, are obtained using other termonomers of the various classes (a) to (f) set forth above, or mixtures of such termonomers.

In practicing the invention, changes may be made in the selection of the specific termonomer or mixture thereof, in the specific catalyst-forming components, and in other details without departing from the spirit of the invention. All such changes and modifications as will be obvious to those skilled in the art from the description and working examples given are intended to be included in the scope of the appended claims.

What is claimed is:

1. High molecular weight, unsaturated random terpolymers of ethylene, propylene and a termonomer which is a hydrocarbon monomer containing at least two double bonds, said terpolymers having a molecular weight above above 20,000 and being characterized in containing, by moles 85.5 to 89.5% of ethylene; 8.6 to 14.2% of propylene; and 0.1 to 10% of the termonomer; in being partially crystalline even in the relaxed state, and in exhibiting a total crystallinity of polyethylene type of 20% to 37.3% on X-ray examination of the crude (total) terpolymer under normal conditions.

2. Terpolymers according to claim 1, further characterized in that the termonomer is selected from the group consisting of non-conjugated aliphatic polyenes; alkenylcycloalkenes; non-conjugated monocyclic dienes; polycyclic endomethylenic polyenes; polycyclic polyenes having condensed rings in which each pair of condensed rings has two carbon atoms in common; and polyalkenylcycloalkanes.

3. Terpolymers according to claim 1, further characterized in that the termonomer is a non-conjugated aliphatic diene.

4. Terpolymers according to claim 1, further characterized in that the termonomer is an alkenylcycloalkene.

5. Terpolymers according to claim 1, further characterized in that the termonomer is a polycyclic polyene having condensed rings and in which each pair of condensed rings has two carbon atoms in common.

6. Terpolymers according to claim 1, further characterized in that the termonomer is 5,7-dimethyloctadiene-1,6.

7. Terpolymers according to claim 1, further characterized in that the termonomer is 4-vinylcyclohexene-1.

8. Terpolymers according to claim 1, further characterized in that the termonomer is 6-methyl-4,9,7,8-tetrahydroindene.

9. The terpolymers of claim 1, sulfur-vulcanized to elastomeric materials.

10. Manufactured articles obtained by shaping a mass comprising a terpolymer according to claim 1.

11. Manufactured articles obtained by shaping a mass comprising a terpolymer according to claim 1 prior to or simultaneously with vulcanization of the terpolymer.

References Cited

UNITED STATES PATENTS

| | | | |
|---|---|---|---|
| 2,933,480 | 4/1960 | Gresham | 260—80.78 |
| 3,000,866 | 9/1961 | Tarney | 260—80.78 |
| 3,063,973 | 11/1962 | Gladding | 260—79.5 |
| 3,093,620 | 6/1963 | Gladding | 260—79.5 |
| 3,093,621 | 6/1963 | Gladding | 260—80.78 |
| 3,173,903 | 3/1965 | Lukach | 260—88.2 |
| 3,378,606 | 4/1968 | Kontos | 260—878 |

FOREIGN PATENTS 638,656   4/1962   Italy.

JAMES A. SEIDLECK, Primary Examiner
R. S. BENJAMIN, Assistant Examiner

U.S. Cl. X.R.

260—80.78